United States Patent [19]

Kallaes et al.

[11] 4,418,891

[45] Dec. 6, 1983

[54] DEVICE FOR TENSIONING CHAINS

[75] Inventors: Elis Kallaes; Karl-Erik Starell, both of Orsa, Sweden

[73] Assignee: Orsa Kattingfabrik AB, Stockholm, Sweden

[21] Appl. No.: 449,625

[22] Filed: Dec. 14, 1982

Related U.S. Application Data

[63] Continuation of Ser. No. 207,659, Nov. 17, 1980, abandoned.

[30] Foreign Application Priority Data

Nov. 23, 1979 [SE] Sweden ................................. 7909717
Sep. 11, 1980 [SE] Sweden ................................. 8006371

[51] Int. Cl.³ ............................................. B21F 9/00
[52] U.S. Cl. ................................ 254/260; 24/68 CT; 140/12; 140/103
[58] Field of Search ............................... 254/243–260; 24/68 CT, 68 CD; 410/12, 100, 103

[56] References Cited

U.S. PATENT DOCUMENTS 679,873  8/1901  Backus ................................. 254/260
2,621,020 12/1952  Call ................................. 24/68 CD

FOREIGN PATENT DOCUMENTS 352401  of 0000  Fed. Rep. of Germany ... 24/68 CT
223476 11/1967  Sweden .

Primary Examiner—Billy S. Taylor
Attorney, Agent, or Firm—Christie, Parker & Hale

[57] ABSTRACT

A chain tensioner is provided with a take-up hook (21) connected to the junction area (30) between the shank (3) thereof and double hook end (4) by means of a chain (20). The take-up chain (20) has an end link (23) surrounding the shank material of the tensioner and which is bound by its form between the shank portion (23) on one side and material projections (22) on the flattened end portion (4). The link (23) surrounds the junction area (30) with clearance so that the link (23) can be swung relative to the direction of the shank (3). The link (23) connecting the take-up chain (20) to the tensioner is to advantage made in a C-shape so that the take-up chain (20) with hook (21) can be easily hooked-on to or hooked off the tensioner.

13 Claims, 9 Drawing Figures

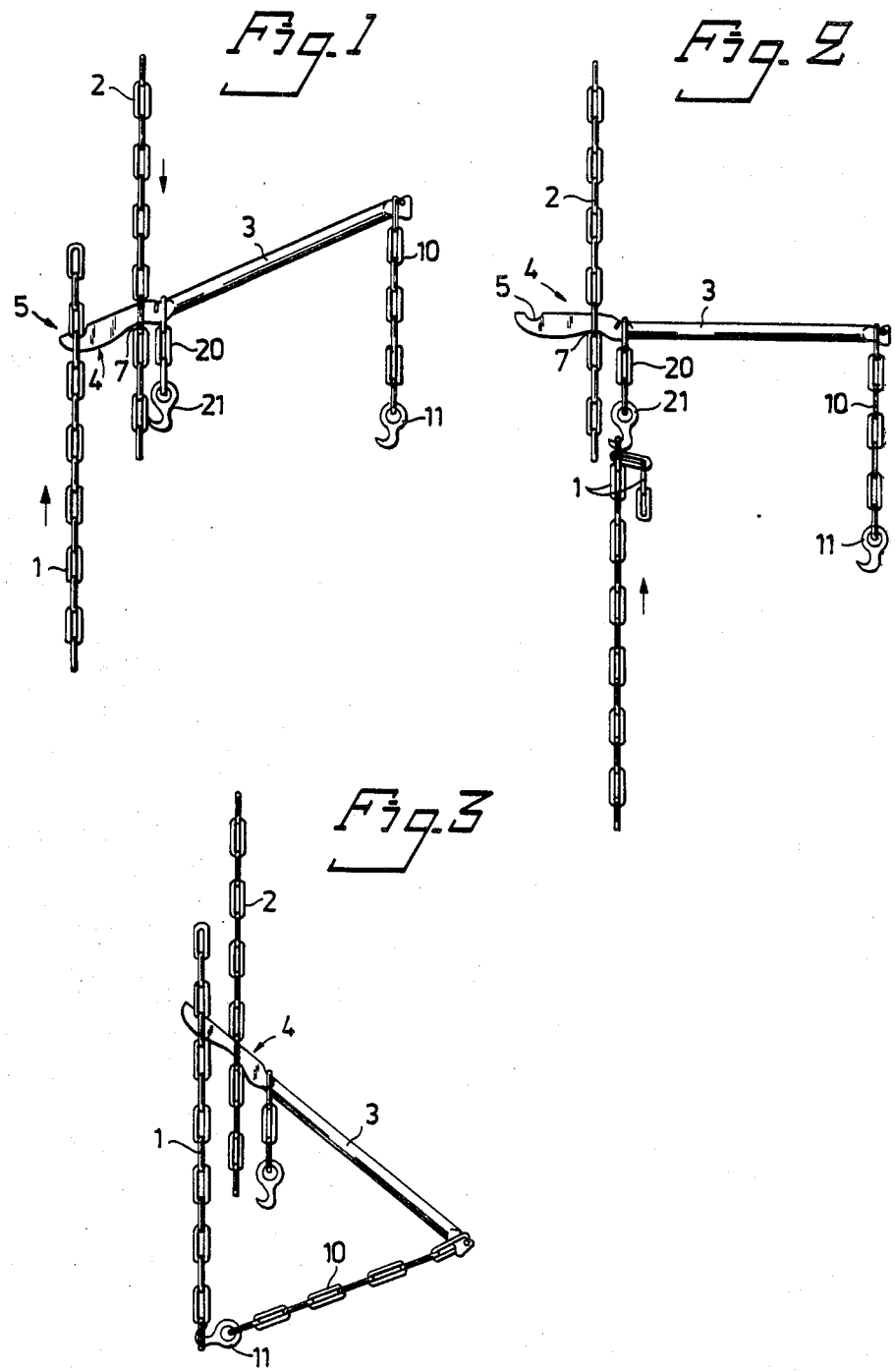

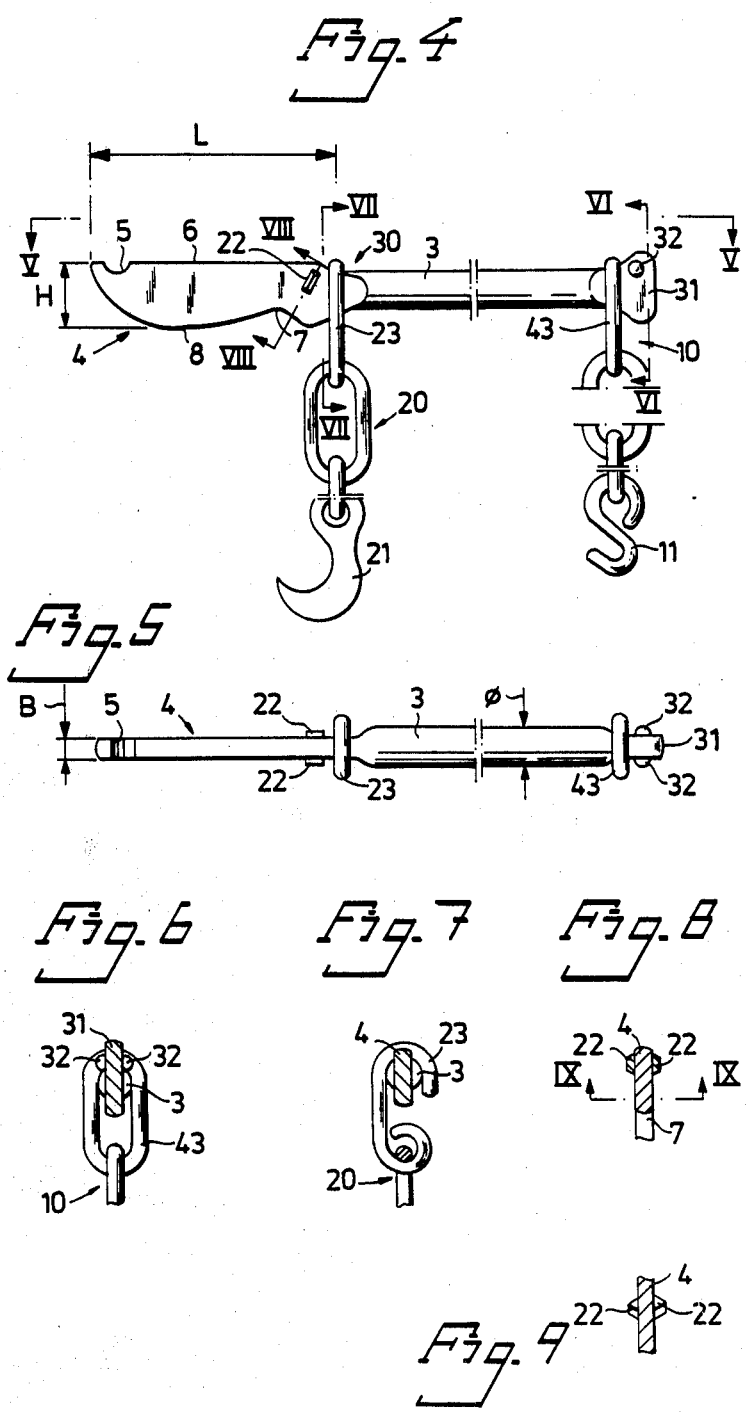

DEVICE FOR TENSIONING CHAINS

This is a continuation of application Ser. No. 207,659, filed Nov. 17, 1980, now abandoned.

FIELD OF THE INVENTION

The invention relates to a device for tensioning chains.

BACKGROUND

A device of the type described above is previously known from the Swedish Patent specification No. 223 476. The flattened end portion with recesses which can be considered as constituting opposingly directed hooking elements in sequence with each other is formed by considerable forging of one end of a bar material, the main portion of which forms the shank. The shank end portion is forged to provide a shape substantially that of an "S". The take-up chain's end link is fitted to a hole in the end portion in the junction area between shank and end portion. The junction area is forged out to a substantial height for withstanding the bending stresses occurring, and because the bore reduces strength in the highly stressed area. Due to the height which is forged, the end portion is laterally weak which easily causes the device to collapse with heavy stresses. The locking chain is attached to the other end of the shank in a corresponding way, although the stresses do not cause any risk of collapse or rupture. On the other hand, such a type of connection results in substantial costs, since a bore must be arranged through the bar material and the link connecting to the bore must be clipped up and threaded through the bore for being finally welded together.

Due to the end portion provided with recesses or hook elements having to be forged out to a substantial height, the problem occurs that the end portion must be given a shape substantially that of an "S". This signifies that with normal link sizes it is not simple to insert the end portion of the device through the chain link in question. In this connection it should be noted that in producing the devices in question the initial material is uniformly thick bar stock for reasons of strength and cost, this stock being forged to desired shape whereafter measures are taken to allow attachment of take-up chain with associated hook and locking chain with associated hook.

The known device is thus burdened with a plurality of disadvantages relating to form/strength, use and production costs.

OBJECT

One object of the invention is therefore to propose a new device of the kind in question, said device affording substantial improvements over the known device as well as reducing or eliminating the disadvantages associated therewith.

SUMMARY OF THE INVENTION

This invention provides a device for tensioning chains comprising a shank having a body and opposite first and second end portions. The first end portion is flattened for receiving a link of a first chain and a link of a second chain and has a free end and opposite first and second narrow edges. A recess on the first edge near the free end is provided for engaging a link of the first chain, and a second recess on the second edge and laterally spaced from the first recess toward the body is provided for receiving a link of the second chain.

A locking chain is swivelably threaded over the second end portion and includes a hook for fastening the locking chain to either the first chain or the second chain to mutually tension the first and second chains.

A take-up chain has a first link which is swivelably threaded over the shank between the second recess and the body. The take-up chain includes a hook for removably fastening into a link of the first chain to permit movement to the first recess into a different link of the first chain for adjusting the device while maintaining mutual tension between the first and second chains.

The device also comprises material projections on the shank between the second recess and the body for limiting lateral movement of the first link of the take-up chain between the body and such material projections.

The need of a bore for the take-up chain link in a highly stressed portion of the device is eliminated by the invention. It is thus possible to start with the lighter bar material than otherwise for manufacturing the device. Furthermore, it will be possible to reduce the amount of forging (i.e. the height of the material) in the end portion provided with recesses. In turn this signifies that the forging operations can be carried out with simple forging equipment, while advanced forging equipment is needed for the known device.

The locking chain link can be attached to the second shank end in a corresponding manner, namely by flattening said shank end while establishing material projections on both main surfaces of the flattened portion.

The chain links utilized are brought into place by being threaded over the respective flattened shaft end portion and into the area between the shank and the material projections, whereafter the chain link is deformed so that it is axially retained by means of its form in the said area. It may possibly be necessary to enlarge said link first and then return the link to its original free width in said area.

According to an especially preferred embodiment of the invention, the link connecting the take-up chain to the shank is made in a C-shape so that it can be easily hooked onto and off from the shank. In this way, the device can be used as a simple tensioning device, e.g. when the chain tension can be provided without needing an extra take-up. In the case where the chain tension needs to be maintained while the outer recess or hook element of the device is moved to a new chain link, a take-up chain with hook can be easily hooked onto the shank by means of a C-shaped end link. When the tensioned chains are fixed by the locking chain hook being hooked into one of the tensioned chains, the take-up chain and hook can be quite simply removed. The last-mentioned working method is usual in lashing down containers on ship decks, for example, the device being left as a locking means in the lashing. By means of the invention, the take-up chain with associated hook need only be utilized when the lashing is tensioned (possibly also when the latter is released), and therefore only the shank portion and locking chain need to accompany the lashing during transport. The total cost of the lashing will thus be lower.

Without the take-up chain, the device can also be used for simpler tasks without the operator being hindered by any permanently attached take-up chain and hook.

The said one narrow edge of the end portion preferably has a third shallow recess in the junction area between the end portion and the shank, this third recess serving to establish a fulcrum for the take-up chain connecting link. In the device according to the invention, the flattened end portion can have a substantially rectangular configuration and can be elongated in a direction away from the shank, the end portion merging substantially symmetrically with the shank portion. The recesses can be formed by stampings made in the respective narrow edge of the flattened substantially rectangular end portion. The flattened end portion's height can be somewhat less than the free link height in said first and said second chain.

The relationship between the flattened end portions width, the cross sectional dimension of the shank and the height of the flattened end portion is preferably in the order of magnitude 1:2:3, the relationship between the depth of the recesses and the height of the flattened end portion being preferably about 1:4. The relationship between the flattened end portion's length and height is approximately 3:1.

The invention will now be described in detail in the following in the form of an example while referring to the attached drawing.

BRIEF DESCRIPTION OF THE DRAWINGS

The FIGS. 1 to 3 illustrate the working method for devices of the kind according to the invention.

FIG. 4 is a schematic side view of a device in accordance with the invention.

FIG. 5 is a view taken along the line V—V in FIG. 4.

FIG. 6 is a section taken along the line VI—VI in FIG. 4.

FIG. 7 is a view taken along the line VII—VII in FIG. 4.

FIG. 8 is a section taken along the line VIII—VIII in FIG. 4, and

FIG. 9 is a view taken along the line IX—IX in FIG. 8.

PREFERRED EMBODIMENTS

FIG. 1 illustrates two chains 1,2 which are to be mutually tensioned by means of a device comprising a shank 3 with a flattened end portion 4 having an outer recess 5 for co-action with a link in the first chain 1, and an inward opposingly directed recess 7 for co-action with a link in the chain 2. There is further a take-up chain 20 connected to the junction area between the shank 3 and end portion 4. The chain 20 has a hook 21. A locking chain 10 is connected to the other end of the shank 3. The chain 10 has a hook 11. By swinging the shank 3 downwards in FIG. 1, the chains 1 and 2 will be mutually tensioned. If the chain tension attained is satisfactory after swinging the shank 3, the hook 11 of the locking chain can be engaged, e.g. to the chain 1 as indicated in FIG. 3, the device thus constituting a lock for the tensioned chains 1,2.

If the tensioning of the chains 1,2 afforded by a single swinging movement of the shank 3 is not satisfactory, however, the hook 21 of the take-up chain 20 can be engaged in the tension chain 1, as will be seen from FIG. 2, and the chain 1 released from the recess 5 for again swinging the shank 3 upwards in FIG. 2. Should this swinging movement not result in the desired mutual tensioning of the chains 1,2, a link in the chain 1 can be hooked into the outer recess 5, whereafter the shank 3 is swung downwards so that the hook 21 can be released for a possible new take-up.

A preferred embodiment of the device in accordance with the invention is illustrated in FIG. 4. It will be seen from FIG. 4 that the end portion 4 is formed by a simple forging of an end portion of a bar material, the major portion of which forms the shank 3. The recesses 5 and 7 can be formed by notches or stampings in the respective opposing narrow edges 6,8 of the flattened end portion 4. To facilitate the entry of the end portion 4 into a link of the chain 2, the narrow edges 8 can be rounded off towards the short end of the portion 4. Furthermore, the junction between the narrow edge 8 and the recess 7 can be made in a shallow curve in the way illustrated, inter alia to facilitate withdrawing the end portion 4 from the chain 2 (cf. FIG. 1). The connecting link 23 of the chain 20 to the junction area 30 between the end portion 4 and shank 3 can be a whole link, the free width of which is greater than the thickness of the end portion 4, but less than the cross sectional dimension of the shank 3. The link 23 is retained in the junction area 30 with the help of a pair of material projections 22 on either side of the end portion 4. The distance between shank and projections being arranged to allow said link of said chain to swing relative to the axial direction of the flattened end portion. The projections 22 are preferably arranged closer to the narrow edge 6 than to the narrow edge 8 and are preferably made as elongate beads, extending at an angle of about 60° to the axial direction of the shank 3. The beads 22 define the maximum angle of swing which the link 23 can assume relative to the shank 3. A smaller recess is preferably arranged in the junction area 30 on the narrow edge 6 to define a fulcrum for the link 23. The preferred embodiment of the material projections or beads 22 is illustrated in the FIGS. 8 and 9. The projections 22 are preferably formed in conjunction with the forging operation, by which one end of bar stock is forged into the end portion 4. It is, however, fully possible to provide the projections 22 by a welding procedure later.

In a preferred embodiment, the link 23 is made in a C-shape (see FIG. 7). In this way, the link 23 can be hooked firmly in the junction area 30, and also be removed therefrom when there is no longer the need of the take-up chain 20 and associated hook 21.

The other end of the shank 3 is provided with a flattened area 30, the flattening being arranged parallel to that of the end portion 4. Furthermore, there are material projections 32 arranged in the upper edge area of the flattened area 30. The connecting link 43 of the locking chain 10 associated with the device is bound by its form to the junction area between the flattened portion 30 and the shank 3 between the shank on one side and the projections 32 on the other. To connect the link 43 to the end of the shaft 3, the link 43 can be first widened and then threaded over the flattened end portion 30 and material projections 32, to be then deformed to its original free width so that it surrounds the flattened portion 30 with clearance and is swingable in relation to the shank 3.

The bar preferably has circular cross section, and the flattened portion is forged out such that it symmetrically merges into the shank portion 3 in the way indicated in FIG. 4. Stamped notches 7 and 5 are arranged in the respective narrow edge 8,6 of the flattened portion 4. The relationship of the flattened portion's width B (see FIG. 5), the diameter $\phi$ of the shank 3 and the flattened portion's height H attains about 1:2:3. The example illustrated is for a device intended to be used for tensioning 9 mm chains, the radius and depths of the notch 5 attaining about 10 mm and the distance between the centres of the notches 5 and 7, observed in the longitudinal direction of the shank 3, attains about 50 mm. In the preferred embodiment, the forward outer corner of the flattened portion opposite the outmost notch 5 is rounded off. The forward wall of the notch 7 is further formed as a ramp with a radius of about 100 mm. The centre of curvature C for the radius of the ramp is in a plane normal to the longitudinal direction of the shank at a distance of about 15 mm from a corresponding normal plane through the centre of the notch 5. Said centre of curvature also lies in a plane of symmetry parallel to the height dimension of the flattened portion 4.

The distance between the centres of the notches 5,7, observed in the longitudinal direction of the shank, is preferably about the same as the free inner length of the links in the chains which are to be tensioned. The distance between the notch 7 and chain link 23 is somewhat greater than half the distance between the notches 5 and 7. The height H corresponds to substantially half the free inner length dimension of the links in the chains which are to be tensioned.

As indicated above, the diameter or corresponding dimension of the shank 3 should be greater than the dimension of the free width in the link 23.

In an actual embodiment intended to co-act with chains of 9 mm the initial bar stock 1 has a diameter of 22 mm.

We claim:

1. A device for tensioning chains comprising a shank having a body and opposite first and second integral end portions, the first end portion being flattened for receiving a link of a first chain and a link of a second chain, the first end portion having a free end and opposite first and second narrow edges, at least the first narrow edge being substantially straight along its length and extending substantially parallel with the body from the tip of the free end to the point where the flattened end portion joins the body of the shank;
   a first recess on the first edge near the free end for engaging a link of the first chain;
   a second recess on the second edge and laterally spaced from the first recess toward the body for receiving a link of the second chain;
   a locking chain swivelably attached around the second end portion and including a hook for fastening the locking chain to either the first chain or the second chain to mutually tension the first and second chains;
   a take-up chain having a first link swivelably attached around without passing through the shank between the second recess and the body and including a hook for removably fastening into a link of the first chain to permit movement of the first recess into a different link of the first chain for adjusting the device while maintaining mutual tension between the first and second chains; and
   material projections on the shank between the second recess and the body for limiting lateral movement of the first link of the take-up chain along the shank between the body and such material projections thereby to prevent the take-up chain from engaging the second recess.

2. A device according to claim 1 comprising a third recess in the first edge of the first end portion next to the body for engaging the first link of the take-up chain.

3. A device according to claim 2 wherein the material projections are located closer to the first edge than to the second edge.

4. A device according to claim 2 wherein the body of the shank is wider than the first link of the take-up chain to limit lateral movement of the first link away from the third recess.

5. A device according to claim 2 wherein the first link is closed and surrounds a junction area between the body and the first end portion.

6. A device according to claim 2 wherein the first link is open and is removable from the shank.

7. A device according to claim 1 where the first end portion has a substantially rectangular configuration and is integral with the body.

8. A device according to claim 7 where the first end portion has a width, and a height between the first and second narrow edges, and the body is round in cross section having a diameter, and where the width and the height of the first end portion is related to the cross sectional diameter of the body substantially in a ratio of about 1:3:2.

9. A device according to claim 8 where the first recess and the second recess each have a depth which is about ¼ the height of the first end portion.

10. A device according to claim 8 where the first end portion has a length which is about 3 times as great as its width.

11. A device according to claim 1 where the second end portion is flattened substantially coplanar with the first end portion, and including material projections between a free end of the second end portion and the body for preventing disconnection of the locking chain from the second end portion.

12. A device according to claim 11 wherein the material projections on the second end portion are located near an edge of the second end portion which is on the same side of the device as the first edge of the first end portion.

13. A device for mutually tensioning a first chain and a second chain comprising a shank having a cylindrical body and opposite first and second end portions, the body having a cross-sectional area which is greater than the open area associated with the links of the chains, the first end portion being flattened along one axial dimension to reduce its cross-sectional area whereby the first end portion can be inserted through a link of the first chain and a link of the second chain to engage the chains, the flattened first end portion having a free end and opposite first and second narrow edges which are substantially parallel with the body, the first edge having a first recess near the free end for engaging a link of the first chain, the second edge having a second recess laterally spaced from the first recess for receiving a link of the second chain;
   a locking chain swivelably attached around the second end portion, the locking chain including a hook for fastening the locking chain to either the first chain or the second chain to mutually tension the first and second chains;
   a take-up chain having a first link swivelably attached around without passing through the shank between the first end portion and the body, the take-up chain including a hook for removably fastening the take-up chain into a link of the first chain to permit movement of the first end portion into a different link of the first chain for adjusting the device while maintaining mutual tension between the first and second chains; and material projections on the shank between the first end portion and the body, the cross-sectional area of the shank at the material projections and at the body being greater than the open area of the first link of the take-up chain for confining movement of the first link of the take-up chain between the material projections and the body thereby to prevent the take-up chain from engaging the second recess.

* * * * *